(12) United States Patent
Yang et al.

(10) Patent No.: US 7,675,517 B2
(45) Date of Patent: Mar. 9, 2010

(54) SYSTEMS AND METHODS OF GRADIENT ASSISTED VOLUME RENDERING

(75) Inventors: Lining Yang, East Windsor, NJ (US); Daqing Xue, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 494 days.

(21) Appl. No.: 11/677,243

(22) Filed: Feb. 21, 2007

(65) Prior Publication Data

US 2008/0033277 A1 Feb. 7, 2008

Related U.S. Application Data

(60) Provisional application No. 60/835,359, filed on Aug. 3, 2006.

(51) Int. Cl.
*G06T 17/00* (2006.01)
(52) U.S. Cl. .................. 345/424; 345/421
(58) Field of Classification Search .............. 345/424, 345/421
See application file for complete search history.

(56) References Cited

U.S. PATENT DOCUMENTS

| 5,594,842 | A | 1/1997 | Kaufman et al. | |
|---|---|---|---|---|
| 5,760,781 | A | 6/1998 | Kaufman et al. | |
| 6,445,390 | B1 * | 9/2002 | Aftosmis et al. | 345/421 |
| 6,525,729 | B1 * | 2/2003 | Akerman et al. | 345/426 |
| 6,587,110 | B1 * | 7/2003 | Kunimatsu et al. | 345/502 |
| 6,597,359 | B1 * | 7/2003 | Lathrop | 345/440 |
| 6,639,597 | B1 * | 10/2003 | Zwicker et al. | 345/421 |
| 6,674,430 | B1 | 1/2004 | Kaufman et al. | |
| 6,680,735 | B1 | 1/2004 | Seiler et al. | |
| 6,798,412 | B2 | 9/2004 | Cowperthwaite | |
| 7,098,907 | B2 | 8/2006 | Houston et al. | |

(Continued)

OTHER PUBLICATIONS

Grimm, S., Bruckner, S., Kanitsar, A., Groller, E., Memory efficient acceleration structures and techniques for CPU-based volume raycasting of large data, Oct. 2004, IEEE Symposium on Volume Visualization and Graphics 2004, pp. 1-8.*

(Continued)

*Primary Examiner*—Ulka Chauhan
*Assistant Examiner*—Said Broome
(74) *Attorney, Agent, or Firm*—Peter L. Kendall

(57) ABSTRACT

A system and method for rendering an image that includes accessing image data and dividing the image data into one or more blocks. One or more corner points of the blocks are identified and rays are cast through voxel space of the image data in the direction of the corner points to determine one or more integrated values for the corner points. The integrated values are then sampled and compared to the sampled values for each combination of the corner points. A difference value ($diff_{value}$) is calculated as a function of the comparison and an initial gradient (grad) is calculated as a function of a Reduced Path Octree (RPO) structure during the casting of rays. Next, a maximum gradient (maxGrad) is calculated based on the initial gradient (grad). Finally, an image processing operation is determined as a function of the maximum gradient (maxGrad) and the difference value ($diff_{value}$). The image processing operation may perform interpolation to fill pixel values inside the image data, or it may perform recursive sub-division of the blocks, and cast and sample additional rays.

25 Claims, 9 Drawing Sheets

U.S. PATENT DOCUMENTS

| | | | |
|---|---|---|---|
| 7,133,041 B2 | 11/2006 | Kaufman et al. | |
| 2005/0017971 A1* | 1/2005 | Ard | 345/423 |
| 2005/0285858 A1* | 12/2005 | Yang et al. | 345/420 |

OTHER PUBLICATIONS

Brodlie, K., Wood, J., Recent Advances in Volume Visualization, Apr. 2001, Computer Graphics forum, vol. 20, pp. 125-148.*

Kruger, J., Westermann, R., Acceleration Techniques for GPU-based Volume Rendering, Oct. 2003, Proceedings of the 14th IEEE Visualization 2003, pp. 287-292.*

M. Levoy; "Display of Surfaces from Volume Data"; June, IEEE Computer Graphics and Applications, 8(5):29-37, 1988.

M. Levoy. "Volume Rendering by Adaptive Refinement", The Visual Computer: International Journal of Computer Graphics, 6(1):2-7, 1990.

N. Max. "Optical Models for Direct Volume Rendering", IEE Trans. On Visualization and Computer Graphics, 192): 99-108, Jun. 1995.

U.S. Appl. No. 60/833,121, filed Jul. 25, 2006, entitled "Apparatus and Method for Providing Data Dependent Sampling for High Quality Fast Direct Volume Rendering".

* cited by examiner

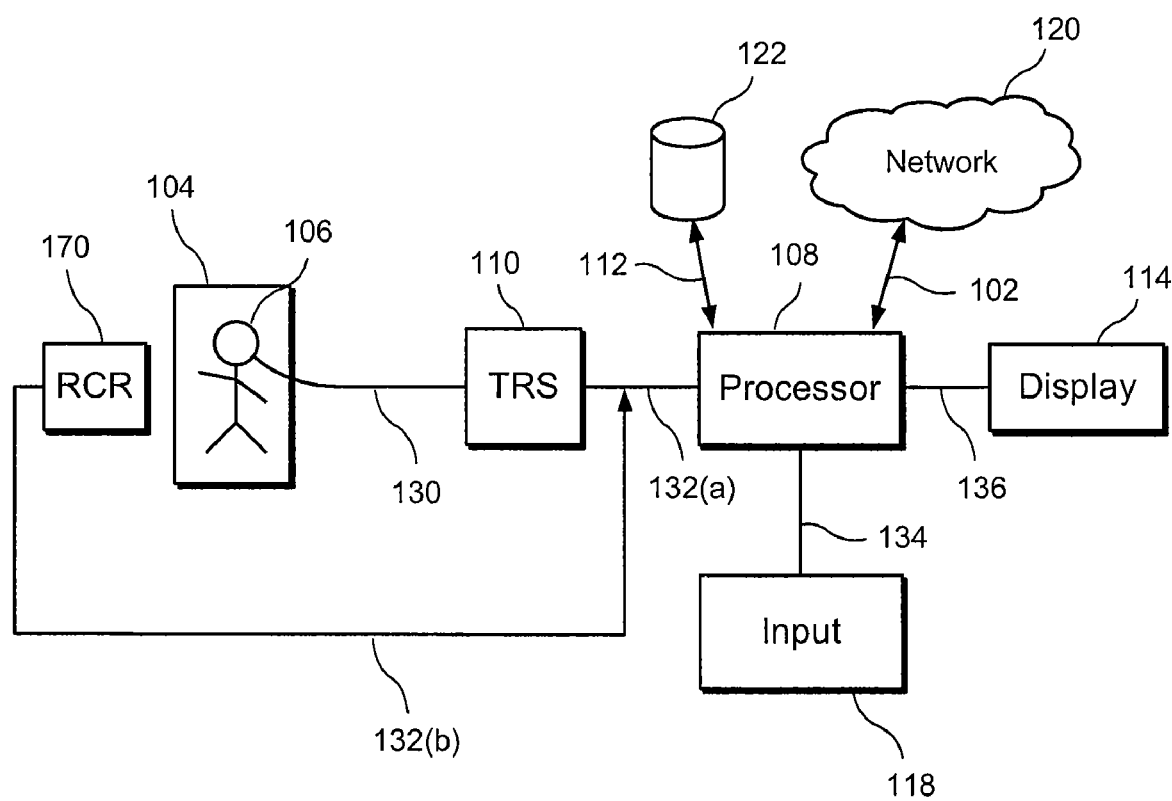
F I G. 1

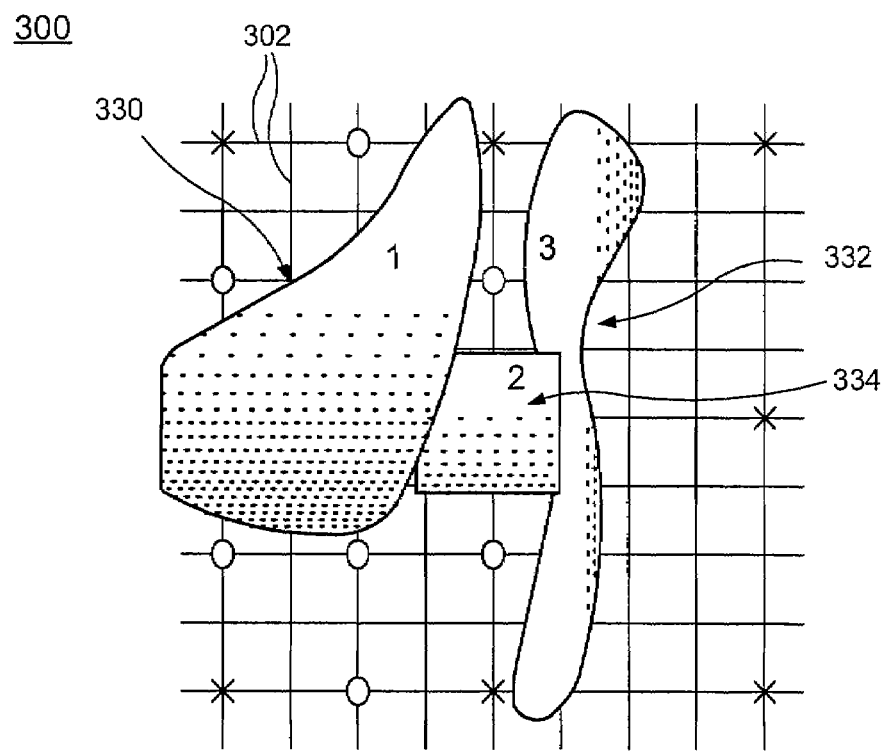
FIG. 3
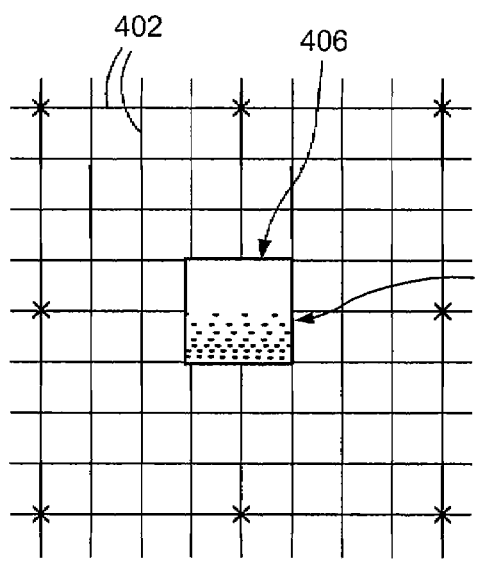 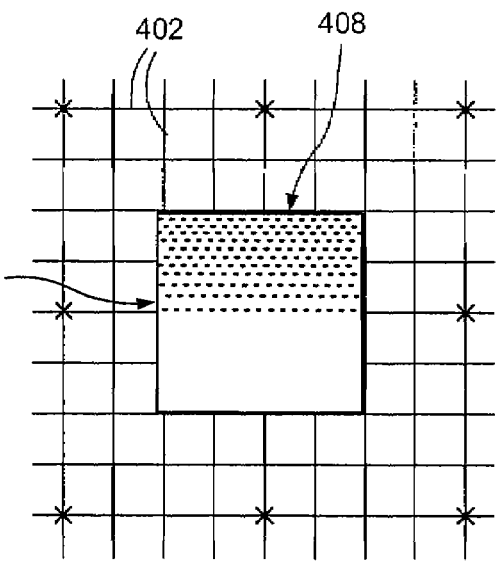
FIG. 4A  FIG. 4B

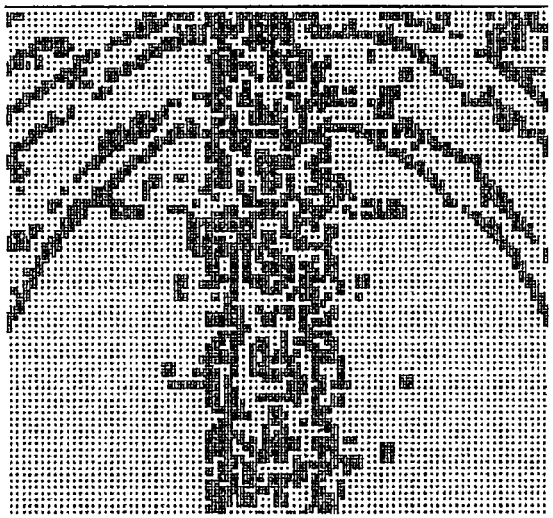
F I G. 8A
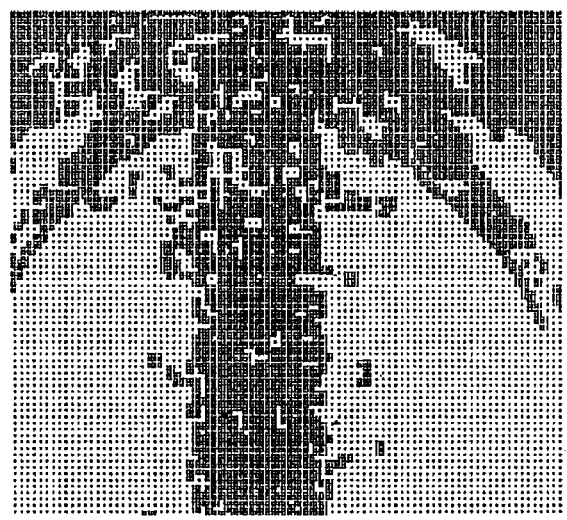
F I G. 8B
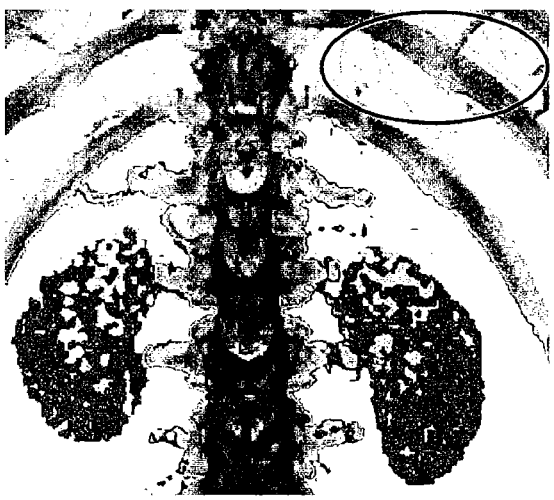
F I G. 9A
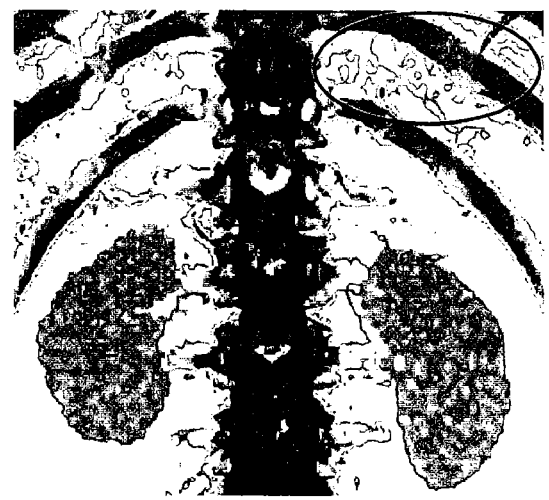
F I G. 9B

SYSTEMS AND METHODS OF GRADIENT ASSISTED VOLUME RENDERING

CROSS-REFERENCE TO RELATED APPLICATIONS

This application claims a priority benefit to provisional application Ser. No. 60/835,359, filed on Aug. 3, 2006 and entitled "Gradient Assisted Refinement Scheme for Improving Interactive Mode Volume Rendering Image Quality," which is hereby incorporated by reference in its entirety herein.

BACKGROUND

1. Field of the Invention

This invention relates generally to imaging systems. More specifically, the present invention is directed to systems and methods of image processing in which a pixel gradient as well as value comparison are used to improve image quality.

2. Background Discussion

Medical imaging techniques provide doctors and medical technicians with valuable data for patient diagnosis and care. Various imaging techniques include cardiac angiography, peripheral angiography, radiography, computed tomography and positron emission tomography. All of these imaging techniques produce medical images that are studied by medical personnel. A higher quality image leads to more accurate diagnosis.

Radiography is the use of certain spectra of electromagnetic radiation, usually x-rays, to image a human body. Angiography, a particular radiographic method, is the study of blood vessels using x-rays. An angiogram uses a radiopaque substance, or contrast medium, to make the blood vessels visible under x-ray. Angiography is used to detect abnormalities, including narrowing (stenosis) or blockages (occlusions), in the blood vessels throughout the circulatory system and in certain organs.

Cardiac angiography, also known as coronary angiography, is a type of angiographic procedure in which the contrast medium is injected into one of the arteries of the heart, in order to view blood flow through the heart, and to detect obstruction in the coronary arteries, which can lead to a heart attack.

Peripheral angiography, in contrast, is an examination of the peripheral arteries in the body; that is, arteries other than the coronary arteries. The peripheral arteries typically supply blood to the brain, the kidneys, and the legs. Peripheral angiograms are most often performed in order to examine the arteries which supply blood to the head and neck, or the abdomen and legs.

Computed Tomography (CT), originally known as computed axial tomography (CAT or CT scan), is an imaging technique that uses digital geometry processing to generate a three dimensional image of internal features of an object from a series of two-dimensional x-ray images taken around a single axis of rotation. An iodine dye, or other contrast material, may be used to make structures and organs easier to see on the CT picture. The dye may be used to check blood flow, find tumors, and examine other problems.

Positron emission tomography (PET) imaging may also be used. In PET imaging, a short-lived radioactive tracer isotope, which decays by emitting a positron, and which has been chemically incorporated into a metabolically active molecule, is injected into the patient. The radioactive decay of the positrons is measured to generate an image.

When imaging techniques produce images, the images have a dataset of pixels or voxels (described in more detail below) that can be modified to increase the image quality. For example, medical volumetric dataset sizes have been expanding rapidly with the new advanced CT scanners. For example, typical CT machines from Siemens® Medical Solutions can generate a pixel image dataset at a size of 512×512×4096. The capacity to visualize such datasets with high interactivity and high image quality is helpful to medical professionals in diagnosing disease.

Ray-casting is one technique to generate images. However, interactivity is difficult to achieve due to intensive computation and cache-unfriendly memory access. The large number of sampling rays, which grow as a function of $O(n^2)$ (where n is image resolution), makes the technique even less efficient.

In order to increase the speed of the technique to render an image, usually a different rendering scheme is used for images during interaction (interactive mode) and then when a user stops and examines the image (definitive mode). Thus, the use of different methods has been one approach to improve the interactive mode performance. Other approaches include using nearest neighbor interpolation method as well as reducing rendered image resolution.

Unfortunately, most of the methods currently used compromise the image quality. For example, reducing the rendered image resolution (in Ray-Casting, it means shooting fewer number of rays) is achieved by rendering a smaller image (lower resolution) and then scale the image in 2D to the appropriate resolution.

However this approach is not optimal for balancing the rendering quality and performance because the rendering speed is unacceptably slow. Furthermore, reducing the image resolution by 4 or more in each dimension usually results in poor image quality.

Therefore, it would be an advancement in the state of the art to provide a system and method of generating high quality image data in an interactive mode with high frame rates.

SUMMARY

Accordingly, the present invention is directed to systems and methods of image processing that generate high quality image data in an interactive mode with high frame rates by utilizing gradient information inside the image block.

One embodiment of the present invention is directed to a method for rendering an image (hereinafter, "the method"), which includes accessing an image data grid and dividing the image data grid into one or more blocks. One or more corner points of the blocks are identified. Rays are cast through voxel space of volumetric data in the direction of the corner points to determine one or more integrated values for the corner points. The integrated values are then compared for each combination of the corner points. A difference value (diff$_{value}$) is calculated as a function of the comparison and an initial gradient (grad) is calculated as a function of a Reduced Path Octree (RPO) structure during the casting of rays. Next, a maximum gradient (maxgrad) is calculated based on the initial gradient (grad). Finally, an image processing operation is determined as a function of the maximum gradient (maxGrad) and difference value (diff$_{value}$).

Another embodiment of the present invention is directed to the method described above, wherein the image processing operation performs interpolation to fill pixel values inside the image data.

Yet another embodiment of the present invention is directed to the method described above, wherein the image processing operation performs recursive sub-division of the blocks and additional casting and sampling of rays.

Yet another embodiment of the present invention is directed to the method described above, wherein the initial gradient (grad) quantity comprises a left-upper gradient (grad$_{UL}$), right-upper gradient (grad$_{UR}$), left-lower gradient (grad$_{LL}$) and right-lower gradient (grad$_{LR}$). The maximum gradient (maxGrad) is the maximum of the left-upper gradient (grad$_{UL}$), the right-upper gradient (grad$_{UR}$), the left-lower gradient (grad$_{LL}$) and the right-lower gradient (grad$_{LR}$).

Yet another embodiment of the present invention is directed to the method described above, wherein when the difference value (diff$_{value}$) is greater than a pre-defined difference threshold value (T$_{value}$), the blocks are recursively sub-divided and additional rays are sampled based on new corner points of each sub-division. When the maximum gradient (maxGrad) is larger than a pre-defined gradient threshold (T$_{grad}$), the blocks are recursively sub-divided and additional rays are sampled based on new corner points of each subdivision. The recursive sub-division is performed until the difference value (diff$_{value}$) is below the pre-defined difference threshold value (T$_{value}$) and the maximum gradient (maxGrad) is less than the pre-defined gradient threshold (T$_{grad}$), or the sampling based on new corner points reaches a pre-specified stop level.

Yet another embodiment of the present invention is directed to the method described above, wherein when the difference value (diff$_{value}$) is equal to or less than the pre-defined difference threshold value (T$_{value}$), interpolation is performed to fill pixel values inside the image data. When the maximum gradient (maxGrad) is equal to or less than the pre-defined gradient threshold value (T$_{value}$), interpolation is performed to fill pixel values inside the blocks.

Yet another embodiment of the present invention is directed to the method described above, and also includes selecting a hierarchical level within octree nodes of the Reduced Path Octree structure, the hierarchical level simulating the maximum gradient (maxGrad) along the casted rays for a specified block size.

Yet another embodiment of the present invention is directed to the method described above, and also includes calculating the maximum gradient (maxgrad) of the octree node based on minimum and maximum values for the Reduced Path Octree structure.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 1 illustrates a medical imaging system utilizing the present invention;

FIG. 3 shows an example of an adaptive sampling scheme according to the present invention;

FIGS. 4A and 4B illustrate an example of using a gradient to enhance image quality according to the present invention;

FIGS. 8A and 8B show examples of image data using the present invention; and

FIGS. 9A and 9B show additional examples of image data using the present invention.

DETAILED DESCRIPTION

Figure 2:
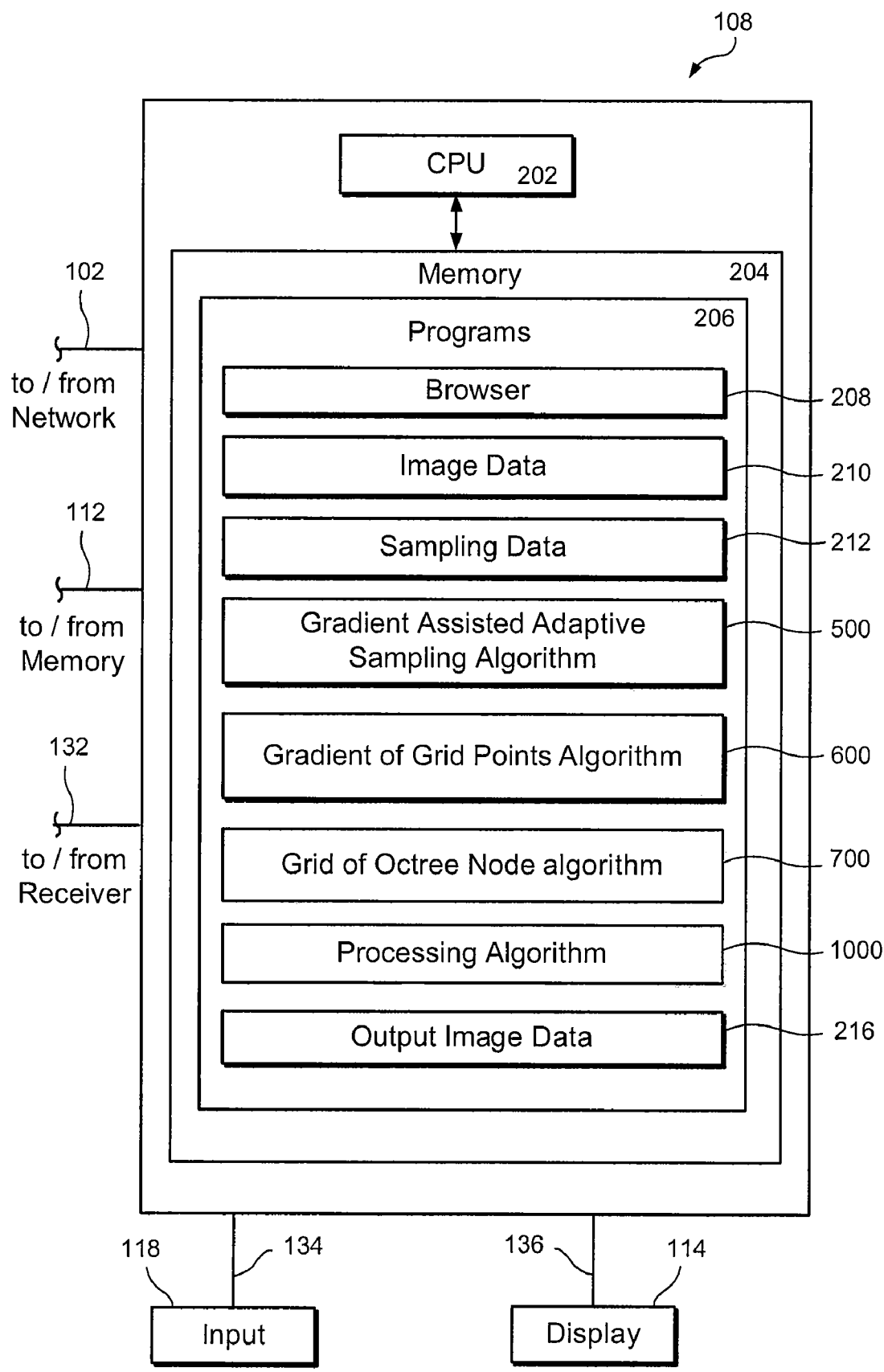
FIG. 2 illustrates a processing apparatus that may be used with the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The embodiments of the present invention are readily applied, for example, to x-ray imaging in general, CT imaging, PET imaging, and fluoroscopic imaging, which utilize low dose x-rays per image.

A voxel ("volumetric pixel" or 3D pixel) is a volume element, representing a value on a regular grid in three dimensional space. Voxels are analogous to pixels, which represent 2D image data. Voxels are frequently used in the visualization and analysis of medical and scientific data. Some true 3D displays use voxels to describe their resolution. For example, a display might be able to show 512×512×512 voxels. As with pixels, voxels themselves typically do not contain their position in space (their coordinates); but rather, their coordinates are inferred based on their positions relative to other voxels (i.e., their positions in the data structure that makes up a single volume image). The value of a voxel may represent various properties. In CT scans, the values are expressed in Hounsfield units, representing the opacity of an imaged material to x-rays. Different units are used for MRI and ultrasound.

When using a technique to reduce the rendered image resolution (e.g., in ray-casting, shooting fewer number of rays) a rendering of a smaller image is achieved (lower resolution) and then the image is scaled in 2D to the appropriate resolution. However, this approach is less than optimal for balancing the rendering quality and performance because while reducing the image resolution by 2 in each dimension results in acceptable image quality, the rendering speed is still unacceptably slow. Furthermore, reducing the image resolution by 4 or more in each dimension usually results in poor image quality.

When using a technique such as ray casting, upon examination of the resulting image, there are regions which are uniform and there are regions which contain a substantial quantity of high frequency changes. One approach used to exploit this property is called image-space adaptive refinement, which includes sampling the rays on a large sparse grid (8×8). Each grid is divided into 4×4 grids and a determination is made whether to cast more rays or merely perform 2D interpolation for the 4×4 grid points by comparing the difference of the previously rendered rays on the 8×8 grid. The process is repeated until the pixel level, or a pre-specified stop level, is reached.

Increasing the pre-specified stop level can increase the speed of performance; however, it also reduces the rendering quality. When the pre-specified stop level stops at 2×2 or larger grids for rendering in interactive mode, fine features in the image may be missed and the image may blur.

The present invention is directed to using pixel gradient as well as value comparison to improve interactive mode image quality for volume visualization. Compared with the definitive (final) mode, the interactive mode attempts to render the image with higher performance by compromising image quality. This may be achieved by reducing rendering image resolution or reducing volume resolution. In an embodiment of this invention, it is assumed that the only compromise of the image quality comes from reducing the image size (in RayCasting it means casting fewer number of rays). Instead of reducing the image size regardless of the volume/image contents, the changes inside and around small image blocks are tracked to cast relatively more rays inside the blocks which contain fine features of images and cast relatively fewer rays for those blocks that are homogeneous. This technique can be used in any ray casting algorithms for Direct Volume Rendering (DVR), Maximum/Minimum Intensity Projection (MaxIP/MinIP), and other similar applications. For example, high performance with relatively high quality image can be achieved for interactive mode rendering of the dataset (512×512×4096) without using any special graphics hardware for acceleration.

Embodiments of the present invention relate to, inter alia, a new adaptive sampling algorithm which uses the maximum gradient as well as the value difference of the corner points of the block to determine whether to cast more rays or merely interpolate. Also provided is a description of using a maximum gradient value of the Reduced Path Octree (RPO) node. Additionally, a technique to obtain the maximum gradient value inside the octree node is provided. Moreover, one algorithm of the present invention is based on adaptive sampling with enhanced image quality with the same pre-specified stop level without introducing additional cast rays. This is achieved by considering not only the corner points of a block, but also the gradient variation/frequency information of the block as well as immediate neighbor pixels to determine whether there are high-frequency features inside the block which needs more cast rays and hence further subdivision of the block(s).

FIG. 1 illustrates a medical imaging system 100 utilizing the present invention. Medical imaging system 100 includes a processing device 108, a display module 114, an input module 118, a transmitter module 110, remote storage module 122, network 120, patient 106, examination table 104, and receiver unit 170.

A patient 106 is supported by table 104. Transmitter unit, or module, or emitter unit, or module, 110 and receiver unit, or module, or detection unit, or module, 170 produce image data related to a patient 106. The transmission unit 110 generates imaging medium 130, which may be x-rays, positrons, high-frequency sound waves (ultrasound), or other imaging medium. The transmission unit 110 may be, for example, an x-ray emitting unit, such as an x-ray tube, and receiver unit 170 may be, for example, an x-ray detecting unit, such as an x-ray detector.

In an x-ray embodiment, the emitting unit, or module, 110 is adapted to emit x-rays 130 (identifying a plurality of x-ray signals) and may be, for example, an x-ray producing device that includes a source of electrons, a vacuum within which the electrons are accelerated, and an energy source that causes the electrons to be accelerated. The detection unit, or module, 170 is adapted to absorb and measure the emitted x-rays.

The imaging process may also be implemented using Computed Tomography (CT), originally known as computed axial tomography (CAT or CT scan), which uses digital geometry processing to generate a three dimensional image of internal features of an object from a large series of two-dimensional x-ray images taken around a single axis of rotation. An iodine dye, or other contrast material, may be used to make structures and organs easier to see on the CT pictures. The dye may be used to check blood flow, find tumors, and examine other problems or areas of interest. Positron emission tomography (PET) imaging may also be used. In PET imaging, a short-lived radioactive tracer isotope, which decays by emitting a positron, and which typically has been chemically incorporated into a metabolically active molecule, is injected into the patient. The radioactive decay of positrons is measured to generate an image.

Transmitter unit, or emitting unit, 110 and receiver unit, or detection unit, 170 are coupled to processor unit 108 via communication media 132(a) and 132(b), respectively, which are used to provide image data to processing unit 108. Communication media 132 (generally) are, for example, a USB bus, IEEE bus or other bi-directional communication medium that is capable of transmitting data, typically representing a one or more images in an electronic format.

Processor unit 108 is typically a system control unit that controls the operation of the entire system 100, performs image processing, and transmits the image data for display on the image display unit 114. Processor unit 108 typically includes a CPU and memory to perform the necessary data processing and storage functions for system 100.

Processing unit, or device, or module, or terminal, 108 is typically one or more computers, or other processing device(s), wireless processing device, personal computer (PC), desktop, notebook, information appliance and the like. The processing device typically includes processing and storage modules.

The image display unit, or module, 114 is coupled to processor unit 108 via bidirectional communication medium 136, which is typically a bus or wired connection or wireless connection. The display unit 114 is used to display the image data generated by the system 100. The display unit 114 may be, for example, a monitor, LCD (liquid crystal display), a plasma screen, a graphical user interface (GUI) or other module adapted to display output data typically by a representation of pixels. Input module 118 is coupled to processing unit 108 via bidirectional communication medium 134, which is typically a bus or wired connection or wireless connection. The input module 118 may include devices such as a keyboard, mouse, track ball and/or touch pad or any combination thereof.

The image display module 114 may be coupled to another CPU, processor, or computer, such as a desktop computer, or a laptop computer (not shown), and may also be coupled to a keyboard, a mouse, a track ball, or other input device (not shown) and may also have control mechanisms, such as mechanisms to adjust the view, dimensions, color, font, or display characteristics. The processing module 108 may also be coupled to a printer (not shown) to print the output, or a transmission module, such as a DSL line (not shown) or a modem, such as a wireless modem (not shown), to transmit the output to a second location or another display module. This transmission may also be accomplished using a network, such as the Internet, with web browsing capability, or other network of operatively coupled computers, processors, or output devices. One example of a network is shown in FIG. 1 as element 120.

The network 120 is, for example, any combination of linked computers, or processing devices, adapted to transfer (transmit and/or receive) and process data. The network 120 may include wireless and wired transmission capabilities. The network 120 may be a private Internet Protocol (IP) network, as well as a public IP network, such as the Internet that can utilize World Wide Web (www) browsing functionality. Alternatively the network 120 may be an Ethernet network, or any two or more operatively coupled processing devices that can share information.

An example of a wired network is a network that uses communication busses and MODEMS, or DSL lines, or a local area network (LAN) or a wide area network (WAN) to transmit and receive data between terminals (such as processor 108 and memory 122). An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems which enables connection to the Internet or other machines that have Wi-Fi functionality. Wi-Fi networks broadcast radio waves that can be picked up by Wi-Fi receivers that are attached to different computers. As shown in FIG. 1, the network 120 is coupled to processing device 108 via wired or wireless bidirectional communication medium 102.

Memory module 122 is an electronic storage medium, such as a server, or other electronic storage repository that can store data used by system 100. The memory module 122 may include, for example, RAM, ROM, EEPROM or other memory media, such as an optical disk, optical tape, CD, or a floppy disk, a hard disk, or a removable cartridge, on which digital information is stored in the form of bits. The memory module 122 is shown as remote memory coupled to processing module 108 via wired or wireless bi-directional communication medium 112.

FIG. 2 illustrates a processor module 108 that may be used with the present invention. Processor module 108 includes a CPU 202 and memory 204. Also shown in FIG. 2 are the bidirectional communication media 102, 112 and 132. Display module 114 and input module 118 and associated communication media 136 and 134, respectively, are also shown.

The CPU 202 is typically a processor that includes an arithmetic logic unit (ALU), which performs arithmetic and logical operations, and a control unit (CU), which extracts instructions from memory and decodes and executes them, utilizing the ALU when necessary.

Memory module 204 is typically an electronic storage medium such as RAM, ROM, EEPROM or other memory device, such as an optical disk, optical tape, CD, or a floppy disk, a hard disk, or a removable cartridge, on which digital information is stored in the form of bits. It may also include recorders to record to and read from mass storage devices such as, for example, optical disks, magnetic disks, flash semiconductor disks, and other types of storage which may be temporary or permanent.

The memory module 204 stores programs 206, which include, for example, a web browser 208, image data storage 210, sampling data storage 212, gradient assisted adaptation sampling algorithm storage 500, gradient of grid points algorithm storage 600, grid of octree node algorithm storage 700, processing algorithm storage 1000, and output image storage 216, as well as typical operating system programs (not shown), input/output programs (not shown), and other programs that facilitate operation of processing device 108.

Memory module, or facility, 204 is used to store image data either received from the detecting unit (shown as element 170 in FIG. 1) or generated by the CPU 202, based on data received from the detecting unit or other source, such as a remote memory (element 122 in FIG. 1), or network (element 120 in FIG. 1). The memory 204 may be accessed in such a way that the contents of the memory are provided to the CPU 202 and/or system controller 108. Once the data has been accessed, typically by program code to fetch, or retrieve, the desired data stored in memory, it may be processed according to one or more algorithms described here.

Web Browser 208 is an algorithm that provides World Wide Web (www) browsing functionality, for example, any ISP (Internet Service Provider) compatible program. Image data storage module 210 stores image data, such as medical image data obtained from an imaging technique, such as CT, PET, ultrasound, or other image data having a pixel representation. This data may be a volumetric representation formed by a configuration of voxels. Sampling data module 212 is used to stored sampled image data. The sampled image data is typically generated from ray casting algorithms. Algorithm modules 500, 600, 700 and 100 are used to store algorithms, or series of steps, or program code for determining components of the present invention, such as a maximal gradient value, a difference value, a threshold value, sampling values, gradient values, octree node values and other values (described in more detail herein). Output image module 216 is used to store an output image generated by the algorithm. The output image may be stored, transmitted, printed, displayed or otherwise utilized.

Embodiments of this invention generate high quality images in the interactive mode rendering with high frame rates by taking into account the gradient information inside the image block. In order to perform this, octrees are utilized. An octree is a tree data structure in which each internal node has up to eight children. Octrees are most often used to partition a three dimensional space by recursively subdividing it into eight octants. More particularly, octrees are the three-dimensional analog of quadtrees.

Each node in an octree subdivides the space it represents into eight subspaces (octants). In a point region (PR) octree, each node stores an explicit 3-dimensional point, which is the "center" of the subdivision for that node; the point defines one of the corners for each of the eight children. In an MX octree, the subdivision point is implicitly the center of the space that the node represents. The root node of a PR quadtree can represent infinite space; the root node of an MX octree represents a finite bounded space so that the implicit centers are well-defined.

FIG. 3 shows a grid 302 and three features 330, 332 and 334 plotted on the grid 302. Each feature 330, 332 and 334 are a representation of an image.

FIGS. 4A and 4B show a grid 402. In FIG. 4A image 406 is shown with a footprint of 2×2 blocks on grid 402. FIG. 4B shows the image 408, which is enlarged to have a 4×4 block footprint on grid 402.

As described above, it is possible to subdivide an image into small blocks, for example 8×8 blocks. Rays may be cast, or shot, at the grid points of the block and a comparison is made of the four ray values to determine the maximal difference among the sampling rays on the grid points. If the difference is greater than a pre-defined threshold, it means that there is possible high-frequency information inside this image block. The pre-defined threshold may be pre-calculated and retrieved from memory, or may be determined in substantially real time. Therefore, a sub-division of the block is performed and additional rays are cast, or shot, on the grid points of the sub-divided blocks.

If the difference is less than a pre-defined threshold, the block is deemed to be a homogeneous region and therefore a 2D interpolation is adequate to fill in the pixel values inside the block.

The above technique, which uses only the corner point values to determine the interior information, while adequate for some image processing, is not always sufficient, especially if the blocks' footprint is smaller than the ray casting region (i.e., the footprint of the block is too small). For example, there could be fine details in the image that run through the grid but do not touch the grid points. For example, the four corner values for a block may be very similar and the algorithm will therefore only use 2D interpolation instead of casting more rays inside. Hence, the high-frequency region will miss or be blurred due to such 2D interpolation (see FIG. 3, feature 334). For example, feature 334 shown in FIG. 3 is too small, and located in between the grid points, so the four corner points' difference value cannot pickup feature 334.

Embodiments of the present invention provide improved image data visualization by utilizing gradient assisted adaptive sampling, including a calculation of the gradient grid points and a calculation of the maximum gradient for octree nodes of a Reduced Path Octree structure. Each of these are described in more detail below.

Gradient Assisted Adaptive Sampling

Figure 5:
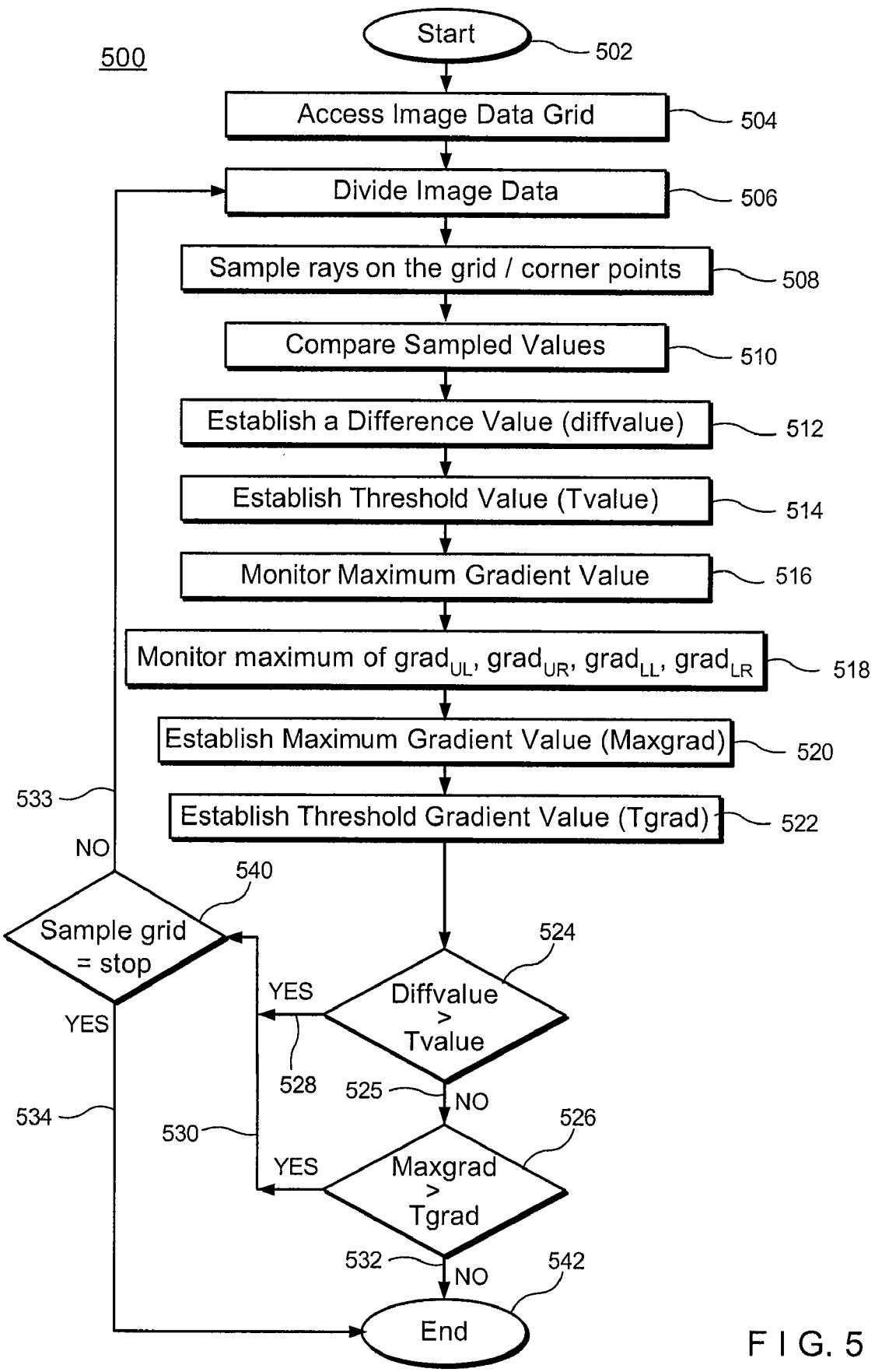
FIG. 5 shows a flowchart of steps to implement an embodiment of determining gradient assisted adaptation according to the present invention.

One embodiment of the present invention utilizes not only the corner values of the blocks of image data, but also the changes (gradients) around the corner points themselves to decide whether to sub-divide the blocks and cast more rays, or just interpolate without casting additional rays. An example of an algorithm to perform this function is provided. FIG. 5 shows a flowchart of steps 500 to implement an embodiment of the present invention. The steps 500 may be executed by a processor, or otherwise executed to perform the identified functions and may also be stored in one or more memories or storage modules. For example, the steps of FIG. 5 may be stored on a computer-readable medium, such as ROM, RAM, EEPROM, CD, DVD, or other non-volatile memory.

The algorithm begins with start step 502. An image data grid, which is used to provide a data structure, or framework, onto which a volumetric data representation comprised of voxels is to be mapped, is accessed as shown in step 504. The image space is initially divided into fixed size blocks, for example, assume the image is divided into 4×4 blocks, as shown in step 506. The rays are only sampled on the grid/corner points, as shown in step 508. In another words, four rays for each 4×4 block are sampled (see, for example, FIG. 3). To adaptively add more sampling rays in the high-frequency area, the sampled/integrated values along the rays on the four grid points are compared against each other, as shown in step 510 and a difference value ($diff_{value}$) is established as shown in step 512. The difference value ($diff_{value}$) represents a difference between the four grip points. A threshold value $T_{value}$ is also determined, as shown in step 514. This threshold ($T_{value}$) may be a pre-established quantity relative to the image grid onto which the volumetric data is mapped. In addition to this corner value comparison, during the casting of the each ray, a maximal gradient is monitored when this ray traverses in the voxel space, which is identified as grad, and shown in step 516. Since there are four rays for the four corner points, these points can be identified as gradients $grad_{UL}$, $grad_{UR}$, $grad_{LL}$ and $grad_{LR}$, to denote the gradients in left-upper, right-upper, left-lower, and right-lower points, respectively.

Establishing the maximum of these four is performed, as shown in step 518 (MaxGrad). The quantity, called maxGrad, is identified, as shown in step 520. Also, a pre-defined threshold gradient value is also identified $T_{grad}$, as shown in step 522.

If either the value comparison difference $diff_{value}$ is greater than the pre-defined threshold $T_{value}$ (step 524) or the maxgrad is larger than the pre-defined threshold $T_{grad}$ (step 526), the block is recursively sub-divided and more rays are sampled on the new corner points of the sub-divided block, as shown by lines 528 and 529 leading to step 506. This process is recursively performed until $diff_{value}$ is below the $T_{value}$ and maxGrad is less than $T_{grad}$ or the sampling grid reaches a pre-specified stop level (for example, the stop level could be 2), (decision step 540, "no" line 529 continues as described above to step 506, "yes" line 534 leads to end step 540). End step 540 shows that the algorithm ends.

Using maximum gradients of the corner points, in addition to value comparison of the corner points, improves the interactive mode quality because a difference of the four corner points of a block only represents the overall changes of that block. Thus, it cannot adequately factor fine features that run inside the block but do not touch the grid points (see FIG. 3, feature 334). However, the largest gradient (frequency change) of the grid points (feature 334) exceeds the threshold and therefore further subdividing of the block is required to capture the possible high-frequency features due to the high gradient information on the sampled grid points.

Calculating the Gradient of the Grid Points

Figure 6:
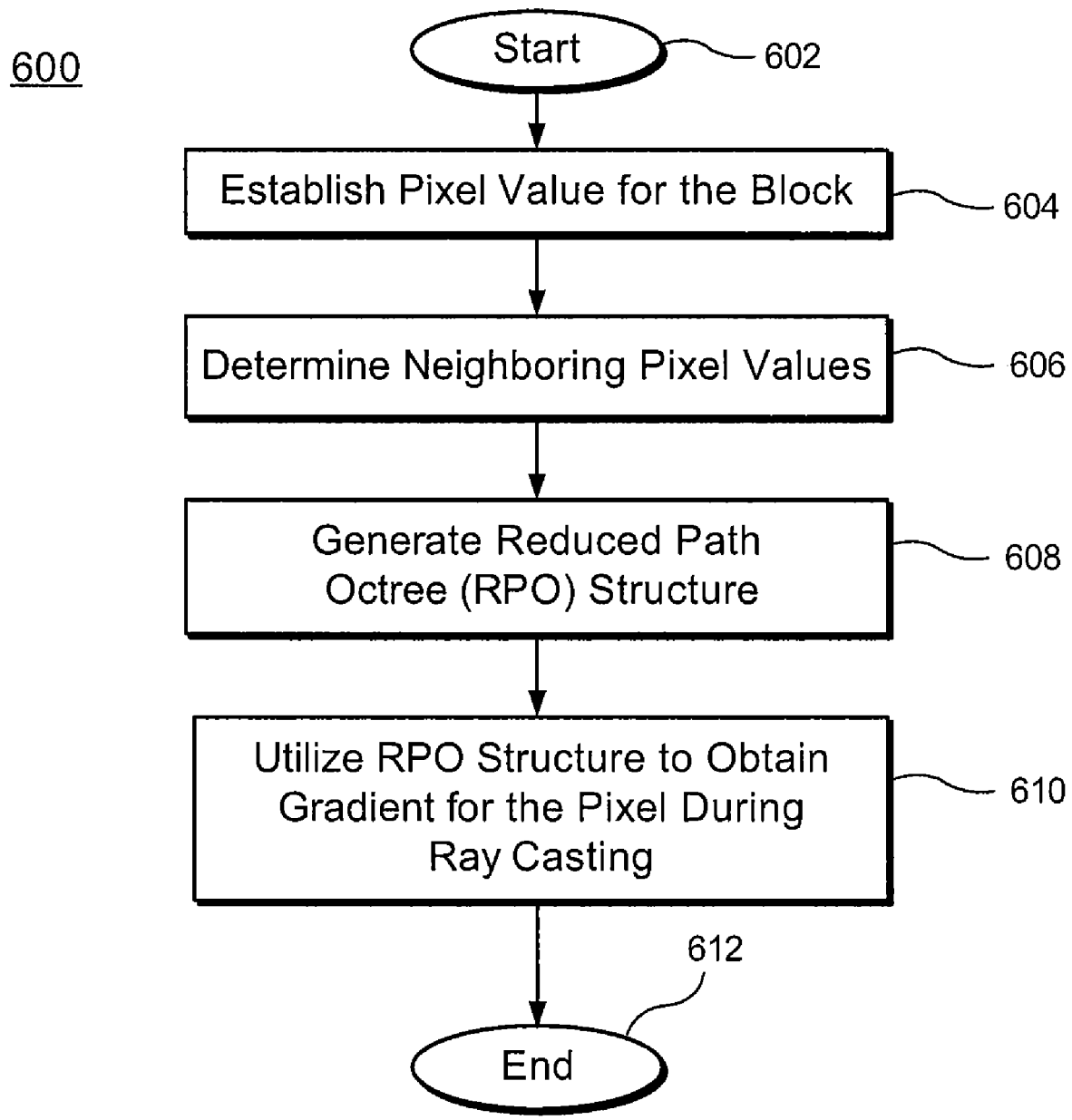
FIG. 6 shows a flowchart of steps to implement an embodiment of calculating gradient grid points according to the present invention.

As described in relation to FIG. 5, it is possible to use maximal gradient as well as value difference of the corner/grid points to determine whether to sub-divide a block and cast more rays. FIG. 6 describes an algorithm to obtain gradients at the grid points. FIG. 6 shows a flowchart of steps 600 to implement an embodiment of the present invention. The steps 600 may be executed by a processor, or otherwise executed to perform the identified functions and may also be stored in one or more memories. For example, the steps of FIG. 6 may be stored on a computer-readable medium, such as ROM, RAM, EEPROM, CD, DVD, or other non-volatile memory.

In order to determine the frequency inside a block (4×4 in this case) in screen space, an algorithm that uses value comparison of the corner points is used to establish the frequency inside the block. However, this approach may yield a very rough estimation and many fine features could be missed, especially with bigger block size. Without casting all the rays inside the block it is difficult to obtain the most accurate frequency information. As shown in FIG. 6, the present invention improves an approximation of the frequency information inside a block by using the gradient of the corner points.

The algorithm 600 begins with start step 602. Pixel values for the block are established as shown in step 604. In order to obtain the gradient of a pixel, it is necessary to determine the values of the neighboring pixels as well, as shown in step 606. For example, referring back to FIG. 3, to obtain the gradient of P, it is necessary to ascertain the values of the surrounding pixels of P. However, the complete set of the surrounding pixel values cannot be obtained during interactive mode rendering. The value of each pixel in screen space is obtained by integration along each ray starting from this pixel location. Therefore, the image-space gradient (pixel difference) depends on the voxel-space gradient (voxel difference).

Referring to FIG. 6, even though precise frequency information or gradient value for P in screen space is not known, it can be approximated by finding the maximal voxel difference for all the samples along the ray in ray cast rendering. However, calculating the gradient for each sample along the ray is computationally expensive.

One alternative is to pre-calculate and store a gradient volume; however, this is expensive for both computation and memory consumption during pre-processing. Another alternative is to generate a Reduced Path Octree (RPO) structure, as shown in step 608, and use this to obtain the gradient for the pixel during ray casting, as shown in step 610. End step 612 shows the algorithm 600 is terminated.

Using the Reduced Path Octree structure has advantages over just using the gradient of individual voxels. One reason is that the gradient in the octree nodes cover a larger region in screen space and, therefore, cover more accurate frequency information in the block.

For example, assuming the voxel spacing is one in all directions and beginning at the major axis, start adaptive sampling in 4×4 grids. As described before, a search for the maximal gradient along this ray is performed while performing ray integration. Using the central difference to calculate each voxel's gradient, projected to screen space, the difference only covers the pixels right next to it (FIG. 4A). However, using the maximum gradient inside each octree node, it is possible to cover a bigger region (FIG. 4B) in screen space. Thus, considering the maximum gradient of all of the four corner pixel points, actually covering the whole 4×4 region and its immediate surroundings.

Therefore, such an approach is more favorable than using the central difference. Since the octree is a hierarchical structure, it is possible to identify the appropriate level to simulate the maximal gradient along the ray for a specified block size on the screen.

Calculating the Gradient for Octree Nodes

As described herein, using the gradient of the octree nodes, which has a larger footprint on the screen, has numerous advantages. As shown in relation to FIG. 7, it is also an embodiment of the present invention to calculate the maximum gradient inside the octree node for different rendering modes. One technique to calculate the maximum gradient of an octree node is to pre-process the volume and store the maximum central difference result of all the voxels inside this octree node. (This is a very time consuming pre-processing step and in most cases it is too expensive for medical applications.) Alternatively, it is possible to use the maximum and minimum values for the Reduced Path Octree structure to estimate the maximum gradient. The difference of the maximum and minimum of the octree node should always be larger or equal to the actual maximum gradient of all the voxels inside this node, and therefore it is a more conservative estimate.

Figure 7:
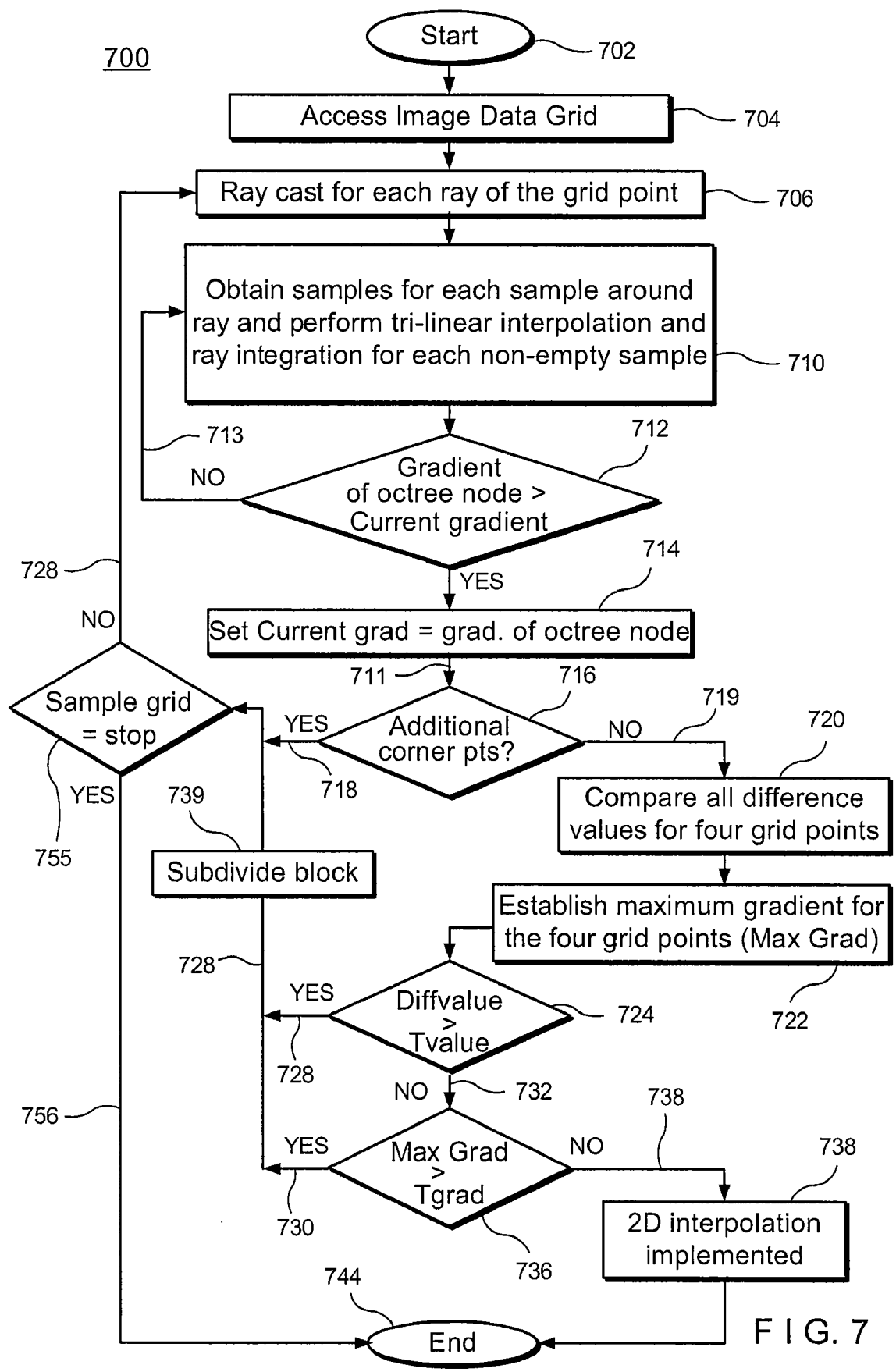
FIG. 7 shows a flowchart of steps to implement an embodiment of calculating the gradient for octree nodes according to the present invention.

FIG. 7 shows a flowchart of steps 700 to implement an embodiment of the present invention. The steps 700 may be executed by a processor, or otherwise executed to perform the identified functions and may also be stored in one or more memories. For example, the steps of FIG. 7 may be stored on a computer-readable medium, such as ROM, RAM, EEPROM, CD, DVD, or other non-volatile memory. The algorithm begins with start step 702.

Initial volumetric data, represented by a plurality of voxels, is to be mapped into a 2D representation. An image data grid is accessed, as shown in step 704. For each ray of the grid point, a ray identifier is cast, as shown in step 706. As shown in step 710, samples are obtained for the grid and samples are obtained for each sample. For each sample along this ray which is non-empty, tri-linear interpolation and appropriate ray integration (compositing for DVR and finding the maximum/minimum for MaxIP/MinIP) is performed. In the meantime, a comparison of the gradient of the octree node and the current gradient is performed, as shown in step 712. If the gradient of the octree node that contains this sample is larger than the current grad, the current grad is set to the gradient of this octree node, as shown by "yes" line 711 leading to step 714. Line 713 leads to step 710.

A determination of whether there are additional corner points is made in step 716. If there are, "yes" line 718 and line 728 lead to step 706. When all 4 corner points are cast for a block, "no" line 719 shows that a comparison is made of the value difference of these 4 grid points $\text{diff}_{value}$, as shown in step 720. The maximum gradient for these 4 points (maxgrad) is established as shown in step 722.

If either $\text{diff}_{value}$ is greater than $T_{value}$ (step 724) or the maxGrad is larger than a pre-defined threshold $T_{grad}$, (step 736) the block will be recursively divided and more rays are sampled on the new corner points of the sub-divided points, as shown by lines 728 and 730 leading to step 739.

If either $\text{diff}_{value}$ is not greater than $T_{value}$ (step 724, "no" line 732) or the maxGrad is not larger than a pre-defined threshold $T_{grad}$, (step 736, "no" line 738) the 2D interpolation will be used instead, as shown in step 738.

This process is recursively performed until $\text{diff}_{value}$ is below $T_{value}$ and the maxGrad is less than $T_{grad}$ or the sampling grid reaches a pre-specified stop level (step 755). When the sampling grid reaches a pre-specified stop level, 'yes' line 756 leads to end step 744. End step 744 shows that the algorithm is terminated.

The present invention also applies to for Direct Volume Rendering (DVR) since DVR usually has a transfer function. A larger gradient of the gray scale value may not necessarily mean a larger gradient in the color/alpha after applying the transfer function. One approach is to use a method that builds a color/alpha variation table efficiently. In a compositing operation also referred as "over" operator in equation (1), the contribution of a sample is weighted by its opacity $\alpha_k$ and the accumulative opacity $\alpha_{accum}$. If $\alpha_k$ is very small or $\alpha_{accum}$ is near 1.0 the weight is near zero. Therefore, the sample from a very translucent region only contributes very little to the final image. High sampling rate in such regions will not improve the rendering quality noticeably. On the other hand, for regions which have opaque surface, meaning there is a large color/opacity change and the region is quite opaque, it is necessary to use a high sampling rate to reduce the artifacts and improve rendering quality. By using the minimum and maximum value of the octree node to look up this table, it is possible to derive the maximum color/alpha gradient after the transfer function. Therefore, it is possible to dynamically change the sampling rate according to color/opacity changes and overall region translucency. This can help improve the performance without visually degrading the rendering quality.

$$C_{accum} = C_{accum} + C_k \alpha_k (1 - \alpha_{accum})$$
$$\alpha_{accum} = \alpha_{accum} + (1 - \alpha_{accum}) \alpha_k \quad (1)$$

Dynamically changing the sampling rate according to regional data and/or color variations (spatial frequency), regional and accumulative opacities and quality settings. Equation (2) describes how the sampling rate of an Octree node along each ray SR is determined by different factors:

$$SR = A(v) \times B(1 - \alpha_{accum}) \times C(\alpha_{diffsum}) \times D(q) \quad (2)$$

Here A(v) is a function of regional variation v that can be data, color and/or alpha variation of the Octree node. $\alpha_{diffsum}$ is a regional opacity measure and $C(\alpha_{diffsum})$ is a function of regional opacity $\alpha_{diffsum}$. D(q) is the function of quality setting q. It can also be viewed as the default sampling rate defined by the application. A, B, C and D in the equation will be used to modulate the variance, accumulated opacity, overall translucency and quality to emphasize the importance of one factor or the other. These functions can be experimentally determined. The more opaque the node is, the more densely we need to sample the node. However, if the accumulated $\alpha_{accum}$ is near completely opaque (1.0) it is acceptable to sample coarsely.

FIGS. 8A and 8B show a comparison of the cast rays using the original adaptive sampling method and the gradient assisted adaptive sampling method of the present invention. The comparison shows that more rays were cast in the high-intensity and high-frequency regions using the method of the present invention compared to the original method. FIG. 9A and 9B show the comparison of the full interactive images using the two different methods. The image quality improvement using the present method is shown in FIG. 9B. FIGS. 8A, 8B, 9A and 9B were generated using a 512×512×1892 CT dataset.

Figure 10A:
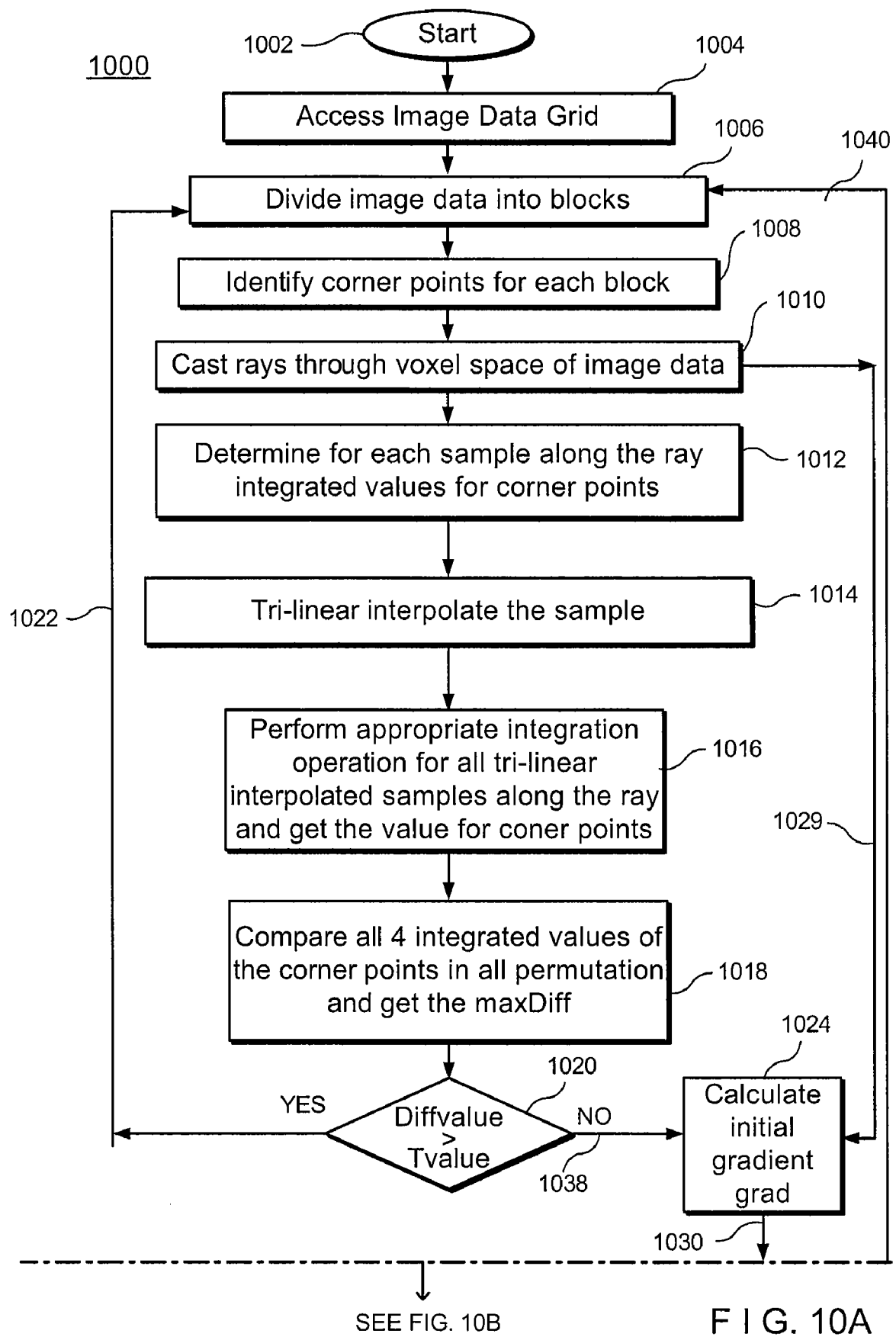
FIG. 10 shows a flowchart of steps to implement an embodiment of the present invention.
Figure 10B:
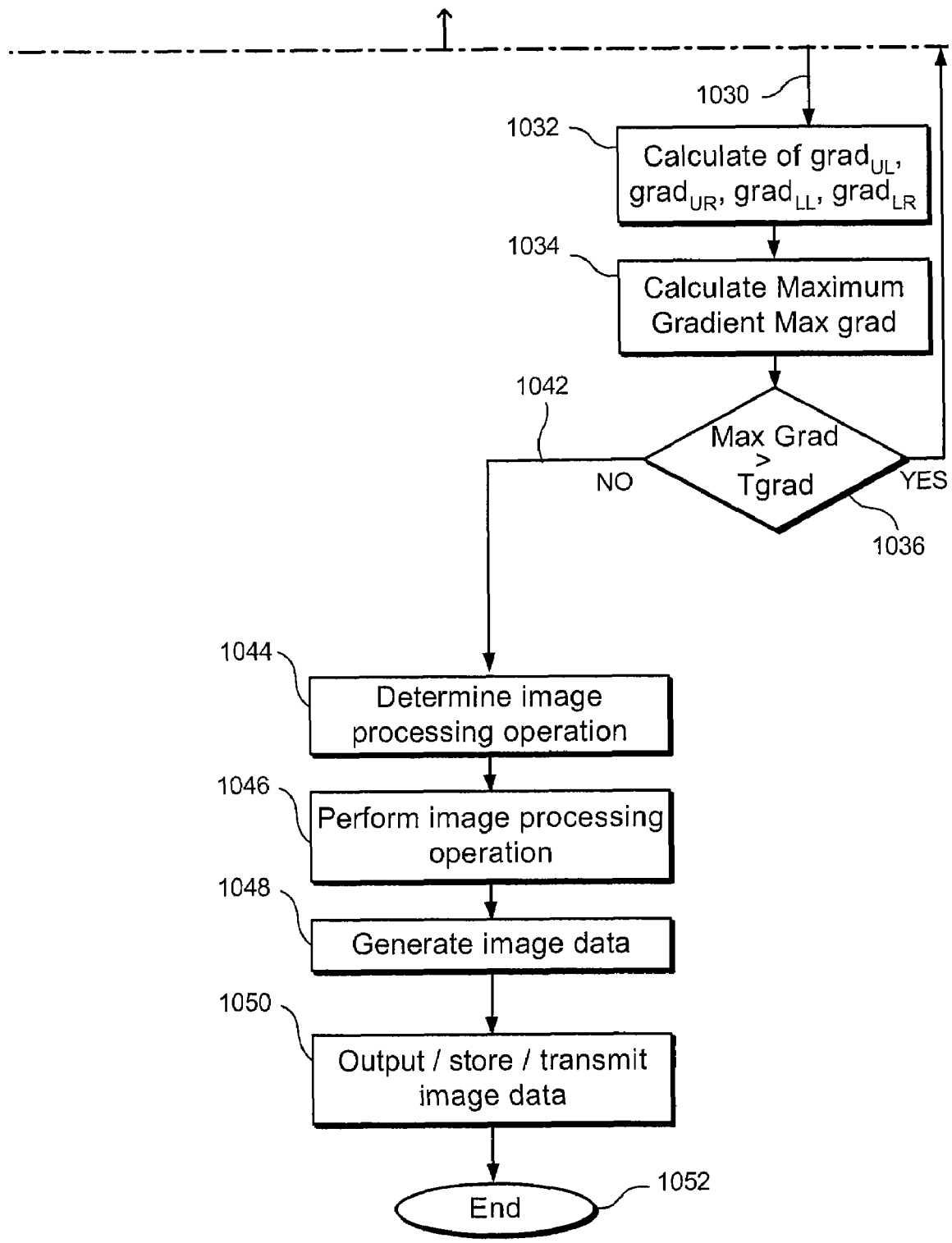

FIG. 10 shows a flowchart of steps 1000 to implement an embodiment of the present invention. The steps 1000 may be executed by a processor, or otherwise executed to perform the identified functions and may also be stored in one or more memories. For example, the steps of FIG. 10 may be stored on a computer-readable medium, such as ROM, RAM, EEPROM, CD, DVD, or other non-volatile memory. The algorithm begins with start block 1002. An image data grid, onto which a volumetric representation is to be mapped, is accessed, as shown in step 1004. The image data is divided into one or more blocks, as shown in step 1006, and one or more corner points for each of the blocks are identified, as shown in step 1008.

Rays are cast through voxel space of the image data in the direction of the one or more corner points (step 1010) to determine one or more integrated values for the one or more corner points for each sample along each ray (step 1012). For each sample along each ray, tri-linear interpolation is performed, as shown in step 1014.

Appropriate integration operations are performed for all of the tri-linear interpolated samples along the ray, in which the values for the corner points is determined, as shown in step 1016. A comparison is made of all four integrated values of the corner points in all permutations and thusly the max difference value (maxDiff) is determined, as shown in step 1018. When the max difference value (maxDiff) is greater than a pre-defined difference threshold value ($T_{value}$), as shown in comparison step 1020, the blocks are recursively sub-divided and additional rays are sampled (line 1022) based on new corner points of each sub-division. Also, as shown by "no" line 1028, and line 1029, an initial gradient (grad) is calculated, for example, as a function of a Reduced Path Octree structure during the casting of rays, as shown in step 1024. The initial gradient (grad) quantity may include a left-upper gradient ($grad_{UL}$), right-upper gradient ($grad_{UR}$), left-lower gradient ($grad_{LL}$) and right-lower gradient ($grad_{LR}$) (step 1032, via line 1030).

A maximum gradient (maxGrad) is calculated based on the initial gradient (grad), as shown in step 1034. The maximum gradient (maxGrad) is, for example, the maximum of the left-upper gradient ($grad_{UL}$), the right-upper gradient ($grad_{UR}$), the left-lower gradient ($grad_{LL}$) and the right-lower gradient ($grad_{LR}$). When the maximum gradient (maxGrad) is larger than a pre-defined gradient threshold ($T_{grad}$) (step 1038), the blocks are recursively sub-divided and additional rays are sampled based on new corner points of each subdivision, as shown by "yes" line 1040 leading to step 1006. Line 1042, leads to step 1044 in which an image processing operation is determined as a function of the maximum gradient (maxGrad) and difference value ($diff_{value}$). The image processing operation is performed, as shown in step 1046. Resultant image data is generated, as shown in step 1048. The resultant image data may be stored, output, displayed and/or transmitted, as shown in step 1050. The algorithm ends, as shown in step 1052.

The image processing operation (step 1046) may perform interpolation to fill pixel values inside the image data. Alternatively, the image processing operation may perform recursive sub-division of the one or more blocks and additional casting and sampling of rays.

It is an embodiment of the present invention that the recursive sub-division (step 1006) is performed until the difference value ($diff_{value}$) is below the pre-defined difference threshold value ($T_{value}$) and the maximum gradient (maxGrad) is less than the pre-defined gradient threshold ($T_{grad}$) or the sampling based on new corner points reaches a pre-specified stop level.

It is also an embodiment of the present invention that when the difference value ($diff_{value}$) is equal to or less than the pre-defined difference threshold value ($T_{value}$), interpolation is performed to fill pixel values inside the image data. When the maximum gradient (maxGrad) is equal to or less than the pre-defined gradient threshold value ($T_{value}$), interpolation is performed to fill pixel values inside the one or more blocks.

It is also an embodiment of the present invention that the maximum gradient (maxGrad) of the octree node is calculated based on minimum and maximum values for the Reduced Path Octree structure.

The present invention provided CT MIP images (as shown in FIGS. 3 and 4) using gradient assisted adaptive sampling scheme. While FIGS. 3 and 4 show results of Maximal Intensity Projection (MaxIP), as described herein, this method can also be applied to other rendering modes such as Direct Volume Rendering (DVR), Shaded Surface Display (SSD), or Minimum Intensity Projection (MinIP).

It will be appreciated from the above that the invention may be implemented as computer software, which may be supplied on a storage medium or via a transmission medium such as a local-area network or a wide-area network, such as the Internet.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for rendering an image from volumetric data, comprising:
   accessing an image data grid;
   dividing the image data grid into one or more blocks;
   identifying one or more corner points of the one or more blocks;
   casting rays through voxel space of the volumetric data in the direction of the one or more corner points to determine one or more integrated values for the one or more corner points;
   comparing the one or more integrated values for each combination of said one or more corner points;
   calculating, utilizing a processor, a difference value (diff$_{value}$) as a function of the comparison;
   calculating an initial gradient (grad) as a function of a Reduced Path Octree structure during the casting of rays;
   calculating a maximum gradient (maxGrad) based on the initial gradient (grad); and
   determining an image processing operation as a function of the maximum gradient (maxGrad) and difference value (diff$_{value}$).

2. The method of claim 1,
   wherein the image processing operation performs interpolation to fill pixel values inside the image data grid.

3. The method of claim 1,
   wherein the image processing operation performs recursive sub-division of the one or more blocks and additional casting and sampling of rays.

4. The method of claim 1,
   wherein the initial gradient corner points (grad) quantity comprises a left-upper gradient (grad$_{UL}$), right-upper gradient (grad$_{UR}$), left-lower gradient (grad$_{LL}$) and right-lower gradient (grad$_{LR}$),
   wherein the maximum gradient (maxGrad) is the maximum of the left-upper gradient (grad$_{UL}$), the right-upper gradient (grad$_{UR}$), the left-lower gradient (grad$_{LL}$) and the right-lower gradient (grad$_{LR}$).

5. The method of claim 1,
   wherein when the difference value (diff$_{value}$) is greater than a pre-defined difference threshold value (T$_{value}$), the one or more blocks are recursively sub-divided and additional rays are sampled based on new corner points of each sub-division,
   wherein when the maximum gradient (maxGrad) is larger than a pre-defined gradient threshold (T$_{grad}$), the one or more blocks are recursively sub-divided and additional rays are sampled based on new corner points of each subdivision, and
   wherein said recursive sub-division is performed until the difference value (diff$_{value}$) is below the pre-defined difference threshold value (T$_{value}$) and the maximum gradient (maxGrad) is less than the pre-defined gradient threshold (T$_{grad}$) or said sampling based on new corner points reaches a pre-specified stop level.

6. The method of claim 1,
   wherein when the difference value (diff$_{value}$) is equal to or less than the pre-defined difference threshold value (T$_{value}$), interpolation is performed to fill pixel values inside the one or more blocks; and
   wherein when the maximum gradient (maxGrad) is equal to or less than the pre-defined gradient threshold value (T$_{value}$), interpolation is performed to fill pixel values inside the one or more blocks.

7. The method of claim 4, further comprising:
   selecting a hierarchical level within one or more octree nodes of the Reduced Path Octree structure, the hierarchical level simulating the maximum gradient (maxGrad) along said casted rays for a specified block size.

8. The method of claim 7, further comprising:
   calculating the maximum gradient (maxGrad) of said one or more octree nodes based on minimum and maximum values for the Reduced Path Octree structure.

9. A system, comprising:
   one or more processing modules;
   one or more memory modules, coupled to the one or more processing modules, adapted to store program code that when executed:
   accesses an image data grid;
   divides the image data into one or more blocks;
   identifies one or more corner points of the one or more blocks;
   casts rays through voxel space of volumetric data in the direction of the one or more corner points to determine one or more integrated values for the one or more corner points;
   samples the one or more integrated values;
   compares the one or more integrated values and the sampled values for each combination of the one or more corner points;
   calculates a difference value (diff$_{value}$) as a function of the comparison;
   calculates an initial gradient (grad) as a function of a Reduced Path Octree structure during the casting of rays;
   calculates a maximum gradient (maxGrad) based on the initial gradient (grad); and
   determines an image processing operation as a function of the maximum gradient (maxGrad) and difference value (diff$_{value}$).

10. The system of claim 9, further comprising program code to:
    perform interpolation to fill pixel values inside the image data.

11. The system of claim 9, further comprising program code to:
    perform recursive sub-division of the one or more blocks and additional casting and sampling of rays.

12. The system of claim 9, further comprising program code to:
    identify the initial gradient (grad) quantity as comprising a left-upper gradient (grad$_{UL}$), right-upper gradient (grad$_{UR}$), left-lower gradient (grad$_{LL}$) and right-lower gradient (grad$_{LR}$); and
    identify the maximum gradient (maxGrad) as the maximum of the left-upper gradient (grad$_{UL}$), the right-upper gradient (grad$_{UR}$), the left-lower gradient (grad$_{LL}$) and the right-lower gradient (grad$_{LR}$).

13. The system of claim 12, further comprising program code to:
- determine that the difference value ($\text{diff}_{value}$) is greater than a pre-defined difference threshold value ($T_{value}$);
- recursively sub-divide the one or more blocks;
- sample additional rays based on new corner points of each sub-division;
- determine that the maximum gradient (maxGrad) is larger than a pre-defined gradient threshold ($T_{grad}$);
- recursively sub-divide the one or more blocks;
- sample additional rays based on new corner points of each subdivision; and
- recursively sub-divide until the difference value ($\text{diff}_{value}$) is below the pre-defined difference threshold value ($T_{value}$) and the maximum gradient (maxGrad) is less than the pre-defined gradient threshold ($T_{grad}$); or until said sampling based on new corner points reaches a pre-specified stop level.

14. The system of claim 13 further comprising program code to:
- determine when the difference value ($\text{diff}_{value}$) is equal to or less than the pre-defined difference threshold value ($T_{value}$), and
- interpolate to fill pixel values inside the image data; and
- determine when the maximum gradient (maxGrad) is equal to or less than the pre-defined gradient threshold value ($T_{grad}$), and
- interpolate to fill pixel values inside the one or more blocks.

15. The system of claim 12, further comprising program code to:
- select a hierarchical level within said one or more octree nodes, the hierarchical level simulates the maximum gradient (maxGrad) along said casted rays for a specified block size.

16. The system of claim 15, further comprising program code to:
- calculate the maximum gradient (maxGrad) of said one or more octree node based on minimum and maximum values for the Reduced Path Octree structure.

17. An apparatus for rendering an image, comprising:
- means for accessing image data grid;
- means for dividing the image data into one or more blocks;
- means for identifying one or more corner points of the one or more blocks;
- means for casting rays through voxel space of volumetric data in the direction of the one or more corner points to determine one or more integrated values for the one or more corner points;
- means for sampling the one or more integrated values;
- means for comparing said one or more integrated values and said sampled values for each combination of said one or more corner points;
- means for calculating a difference value ($\text{diff}_{value}$) as a function of the comparison;
- means for calculating an initial gradient (grad) as a function of a Reduced Path Octree structure during the casting of rays;
- means for calculating a maximum gradient (maxGrad) based on the initial gradient (grad); and
- means for determining an image processing operation as a function of the maximum gradient (maxGrad) and difference value ($\text{diff}_{value}$).

18. The apparatus of claim 17,
- wherein the image processing operation performs interpolation to fill pixel values inside the image data.

19. The apparatus of claim 17,
- wherein the image processing operation performs recursive sub-division of the one or more blocks and additional casting and sampling of rays.

20. The apparatus of claim 17,
- wherein the initial gradient (grad) quantity comprises a left-upper gradient ($\text{grad}_{UL}$), right-upper gradient ($\text{grad}_{UR}$), left-lower gradient ($\text{grad}_{LL}$) and right-lower gradient ($\text{grad}_{LR}$),
- wherein the maximum gradient (maxGrad) is the maximum of the left-upper gradient ($\text{grad}_{UL}$), the right-upper gradient ($\text{grad}_{UR}$), the left-lower gradient ($\text{grad}_{LL}$) and the right-lower gradient ($\text{grad}_{LR}$).

21. The apparatus of claim 20,
- wherein when the difference value ($\text{diff}_{value}$) is greater than a pre-defined difference threshold value ($T_{value}$), the one or more blocks are recursively sub-divided and additional rays are sampled based on new corner points of each sub-division,
- wherein when the maximum gradient (maxGrad) is larger than a pre-defined gradient threshold ($T_{grad}$), the one or more blocks are recursively sub-divided and additional rays are sampled based on new corner points of each subdivision, and
- wherein said recursive sub-division is performed until the difference value ($\text{diff}_{value}$) is below the pre-defined difference threshold value ($T_{value}$) and the maximum gradient (maxGrad) is less than the pre-defined gradient threshold ($T_{grad}$) or said sampling based on new corner points reaches a pre-specified stop level.

22. The apparatus of claim 21,
- wherein when the difference value ($\text{diff}_{value}$) is equal to or less than the pre-defined difference threshold value ($T_{value}$), interpolation is performed to fill pixel values inside the image data; and
- wherein when the maximum gradient (maxGrad) is equal to or less than the pre-defined gradient threshold value ($T_{grad}$), interpolation is performed to fill pixel values inside the one or more blocks.

23. The apparatus of claim 20, further comprising
- means for selecting a hierarchical level within said one or more octree nodes, the hierarchical level simulates the maximum gradient (maxGrad) along said casted rays for a specified block size.

24. The apparatus of claim 23, further comprising:
- means for calculating the maximum gradient (maxGrad) of said one or more octree node based on minimum and maximum values for the Reduced Path Octree structure.

25. A method for rendering an image from volumetric data, comprising:
- accessing an image data grid;
- dividing the image data grid into one or more blocks;
- identifying one or more corner points of the one or more blocks;
- initialize a maximum ray gradient value to zero, and for each sample along this ray:
  - establish grid dimensions;
  - determine an appropriate Octree level containing the sample;
  - calculate, utilizing a processor, a maximum value and a minimum value of an Octree node of the Octree;
  - calculate a gradient based on the difference of the maximum value and the minimum value;
- casting rays through voxel space of the image data in the direction of the one or more corner points to determine one or more integrated values for the one or more corner points;

comparing the one or more integrated values for each combination of said one or more corner points;
calculating a difference value ($\text{diff}_{value}$) as a function of the comparison;
calculating an initial gradient (grad) as a function of the Octree during the casting of rays;
calculating a maximum gradient (maxGrad) based on the initial gradient (grad);
determining an image processing operation as a function of the maximum gradient (maxGrad) and difference value ($\text{diff}_{value}$),
wherein the initial gradient corner points (grad) quantity comprises a left-upper gradient ($\text{grad}_{UL}$), right-upper gradient ($\text{grad}_{UR}$), left-lower gradient ($\text{grad}_{LL}$) and right-lower gradient ($\text{grad}_{LR}$), and
wherein the maximum gradient (maxGrad) is the maximum of the left-upper gradient ($\text{grad}_{UL}$), the right-upper gradient ($\text{grad}_{UR}$), the left-lower gradient ($\text{grad}_{LL}$) and the right-lower gradient ($\text{grad}_{LR}$); and
selecting a hierarchical level within one or more octree nodes of the Reduced Path Octree structure, the hierarchical level simulating the maximum gradient (maxGrad) along said casted rays for a specified block size.

* * * * *